United States Patent
Lipkin (10) Patent No.: US 9,929,802 B2
(45) Date of Patent: Mar. 27, 2018

(54) DECISION THRESHOLD ADJUSTMENT

(71) Applicant: FINISAR CORPORATION, Sunnyvale, CA (US)

(72) Inventor: Ziv Lipkin, Cupertino, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/740,010

(22) Filed: Jun. 15, 2015

(65) Prior Publication Data
US 2016/0365922 A1 Dec. 15, 2016

(51) Int. Cl.
*H04B 10/69* (2013.01)
*H04B 10/079* (2013.01)
*H04J 14/02* (2006.01)
*H04B 3/487* (2015.01)

(52) U.S. Cl.
CPC ....... *H04B 10/07957* (2013.01); *H04B 3/487* (2015.01); *H04J 14/0227* (2013.01)

(58) Field of Classification Search
CPC .................................................... H04B 10/695
See application file for complete search history.

(56) References Cited

U.S. PATENT DOCUMENTS

| | | | |
|---|---|---|---|
| 6,433,899 B1 * | 8/2002 | Anslow | H04B 10/07953 398/5 |
| 2007/0081827 A1 * | 4/2007 | Ide | H04B 10/66 398/209 |
| 2009/0269076 A1 * | 10/2009 | Cai | H04B 10/695 398/135 |
| 2010/0054758 A1 * | 3/2010 | Ereifej | H04B 10/296 398/202 |
| 2010/0271120 A1 * | 10/2010 | Momtaz | H03F 3/45183 330/11 |
| 2010/0284702 A1 * | 11/2010 | Malouin | H04B 10/671 398/208 |
| 2013/0216219 A1 * | 8/2013 | Honda | H04B 10/60 398/27 |
| 2015/0311871 A1 * | 10/2015 | Ide | H03F 1/3211 398/212 |

\* cited by examiner

*Primary Examiner* — Shi K Li
(74) *Attorney, Agent, or Firm* — Maschoff Brennan (57) ABSTRACT

According to an aspect of an embodiment, a method may include receiving a digital data signal at an optical receiver. The method may further include measuring an eye quality of the received digital data signal. In addition, the method may include adjusting a decision threshold of the optical receiver based on the measured eye quality.

18 Claims, 6 Drawing Sheets

DECISION THRESHOLD ADJUSTMENT

FIELD

The embodiments discussed in the present disclosure are related to decision threshold adjustment in optical receivers.

BACKGROUND

Telecommunications systems, cable television systems and data communication networks use optical networks to rapidly convey large amounts of information between remote points. In an optical network, information is conveyed in the form of optical signals through optical fibers. Optical networks often employ multi-channel optical networks, wavelength division multiplexing (WDM) or dense wavelength division multiplexing (DWDM) to increase transmission capacity. In multi-channel networks a number of optical channels are carried in separate optical fibers, in WDM and DWDM networks, a number of optical channels are carried in each fiber at disparate wavelengths, thereby increasing network capacity. In some instances, the channels in multi-channel, WDM or DWDM networks may experience crosstalk through electromagnetic interference (EMI) or through optical crosstalk between adjacent transmitter or receiver ports.

The subject matter claimed in the present disclosure is not limited to embodiments that solve any disadvantages or that operate only in environments such as those described above. Rather, this background is only provided to illustrate one or more example technology areas where some embodiments described in the present disclosure may be practiced.

SUMMARY

According to an aspect of an embodiment, According to an aspect of an embodiment, a method may include receiving a digital data signal at an optical receiver. The method may further include measuring an eye quality of the received digital data signal. In addition, the method may include adjusting a decision threshold of the optical receiver based on the measured eye quality.

The object and advantages of the embodiments will be realized and achieved at least by the elements, features, and combinations particularly pointed out in the claims. Both the foregoing general description and the following detailed description are examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Crosstalk in multi-channel, wavelength division multiplexing (WDM) or dense wavelength division multiplexing (DWDM) optical networks may cause signal degradation or other problems. For example, in some instances crosstalk between channels may result in degradation in the sensitivity of optical receivers configured to receive multi-channel or WDM signals. In the present disclosure, use of the term "WDM" with respect to signals, systems, or components may refer to any signal, system, or component that may be configured or based on WDM methodologies, including DWDM methodologies. In addition, in the present disclosure, use of the term "multi-channel" with respect to signals, systems, or components may refer to any signal, system, or component that may be configured or based on a system in which a number of optical channels are each carried in separate optical fibers.

As disclosed in detail below, the present disclosure relates to systems and methods for compensating for crosstalk with respect to degradation of optical receiver sensitivity. In particular, in some embodiments, a digital data signal may be received at an optical receiver. Additionally, an eye quality of the digital data signal may be measured and analyzed and a decision threshold of the optical receiver may be adjusted based on the measured eye quality and corresponding analysis. Although, the above-referenced adjustment of the decision threshold based on eye quality is given in the context of compensating for problems related to crosstalk, the decision threshold may be adjusted based on a measured eye quality to compensate for other signal degradation also.

Embodiments of the present disclosure are explained with reference to the accompanying drawings.

Figure 1A:
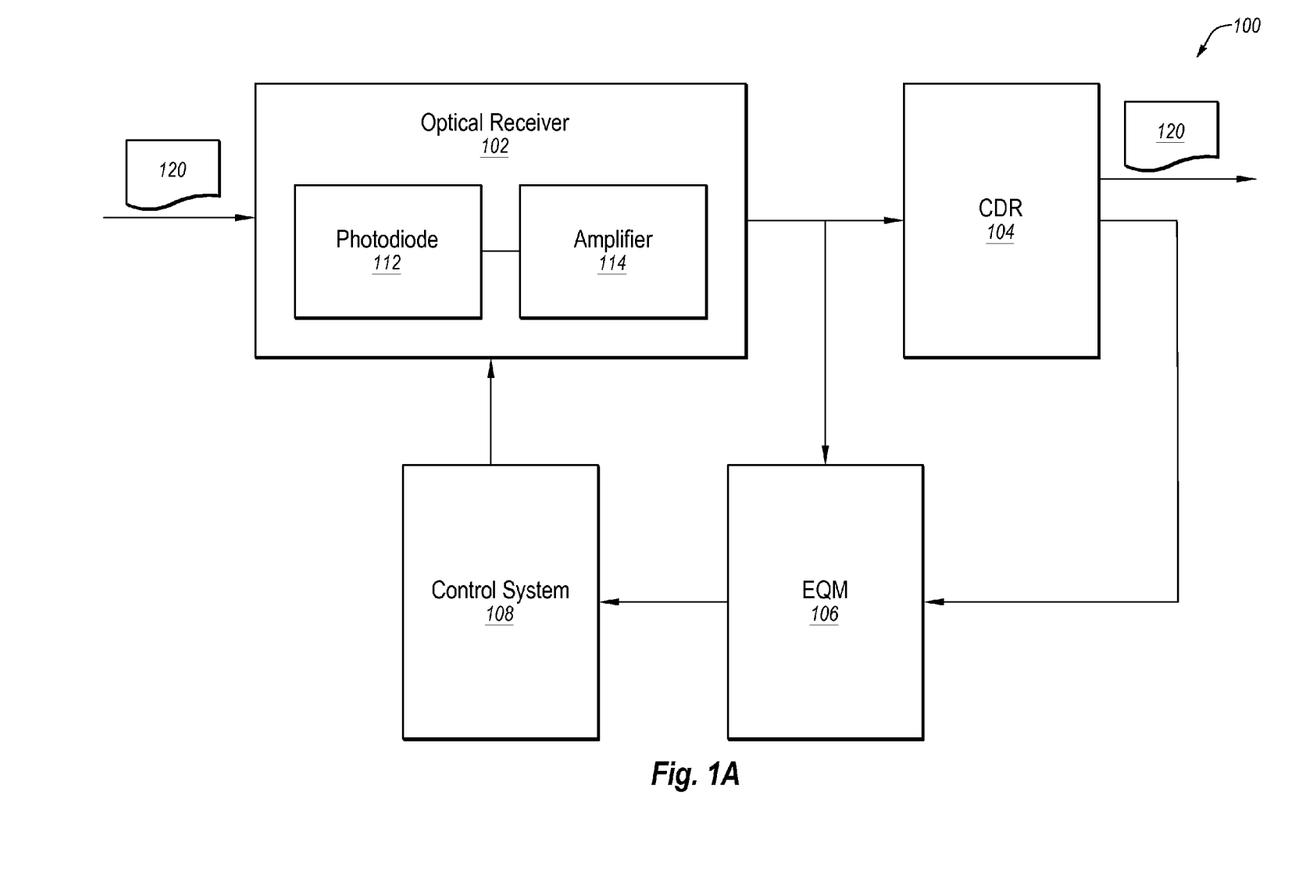
FIG. 1A is a diagram representing an example receiving system configured to adjust a decision threshold of an optical receiver.

FIG. 1A is a diagram representing an example receiving system 100 ("system 100") configured to adjust a decision threshold of an optical receiver 102, according to some embodiments of the present disclosure. In some embodiments, the system 100 may be implemented with respect to each channel of a multi-channel or WDM system. The system 100 may include the optical receiver 102, a clock data recovery circuit (CDR) 104 ("CDR 104"), an eye-quality monitor (EQM) 106 ("EQM 106"), and a control system 108.

The optical receiver 102 may include a photodiode 112. The photodiode 112 may be configured to receive an optical signal that includes digital data 120 such that the optical signal may include a digital data signal. The photodiode 112 may be configured to convert the optical signal into an electrical signal that may also include the digital data 120 such that the electrical signal may also include the digital data signal of the optical signal.

The optical receiver 102 may also include an amplifier 114. The amplifier 114 may be communicatively coupled to the photodiode 112 and may be configured to receive the electrical signal that may be output by the photodiode 112. The amplifier 114 may be configured to amplify the received electrical signal. In some embodiments, the photodiode 112 may output the electrical signal as a current signal and the amplifier 114 may include a transimpedance amplifier (TIA) that may be configured to convert the current signal into a voltage signal.

In some embodiments, the amplifier 114 may include a decision threshold controller (e.g., a comparator). The decision threshold controller may be configured to compare the received electrical signal with a threshold value. In response to the received electrical signal satisfying the threshold value (e.g., being greater than or equal to the threshold value), the amplifier 114 may output a digital "HIGH" value for the electrical signal. Similarly, in response to the received electrical signal not satisfying the threshold value (e.g., being less than the threshold value), as determined by the decision threshold controller, the amplifier 114 may output a digital "LOW" value for the electrical signal. As such, the threshold value may be used as a decision threshold for determining the values of the bits of the digital data 120 included in the digital data signal of the optical and electrical signals.

In some embodiments, the threshold value for the decision threshold controller may be adjustable such that the decision threshold of the optical receiver 102 may be adjusted. As indicated above, in some instances, adjusting the decision threshold may be performed to compensate for signal degradation such as crosstalk.

The CDR (clock data recovery) 104 may be communicatively coupled to the optical receiver 102. In some embodiments, the CDR 104 may be configured to receive the electrical signal that may be amplified by the amplifier 114 ("amplified electrical signal"). The CDR 104 may be configured to recover a clock signal associated with the channel of the optical signal that may be received at the optical receiver 102. In some embodiments, the CDR 104 may be configured to recover the clock signal using a reference clock signal, a phase-lock loop (PLL), and the amplified electrical signal. In some embodiments, the CDR 104 may be configured to output the recovered clock signal.

The CDR 104 may also be configured to phase-align a data stream of the digital data 120 that may be included in the amplified electrical signal. In these or other embodiments, the CDR 104 may be configured to output the phase-aligned and amplified electrical signal as an output electrical signal, which may include the digital data 120. The CDR 104 may include any suitable system, apparatus, or device configured to perform the operations described above for the CDR 104.

The EQM 106 may be communicatively coupled to the CDR 104 and the optical receiver 102. In some embodiments, the EQM 106 may be configured to receive the clock signal that may be output by the CDR 104. The EQM 106 may be configured to perform its operations based on the received clock signal.

Additionally or alternatively, the EQM 106 may be configured to receive the amplified electrical signal that may be amplified by the amplifier 114. The EQM 106 may include any suitable system, apparatus, or device that may be configured to monitor signal quality based on an eye diagram. In particular, in the illustrated embodiment, the EQM 106 may be configured to monitor signal quality of the digital data signal based on one or more eye diagrams of the amplified electrical signal.

In some embodiments, the EQM 106 may be configured to generate the eye diagrams based on the amplified electrical signal. The eye diagrams may represent the digital data signal of the amplified electrical signal. In some embodiments, the eye diagrams may be generated by repetitively sampling the digital data signal and plotting the sampled digital data on monitoring equipment such as an oscilloscope. The eye diagrams may provide information of the digital data signal and the optical system such as channel noise, inter-symbol interference (ISI), performance of a transmitter, crosstalk, or some combination thereof within a particular signaling interval. Opening the eye may generally refer to improving the eye diagrams, which may occur through adjustment of the decision threshold of the optical receiver 102.

In some embodiments, the EQM 106 may be configured to measure the quality of the eye opening of the eye diagrams (also referred to as "eye quality") to determine the quality of the digital data signal. For example, in some embodiments, the EQM 106 may be configured to measure one or more of the following: an overall eye opening, an eye margin, a percentage of eye opening, an internal eye height, an eye amplitude, an eye crossing, an eye quality factor, a vertical eye opening, an eye width, and a horizontal eye opening. A greater overall eye opening, eye margin, percentage of eye opening, internal eye height, eye amplitude, eye crossing, eye quality factor, vertical eye opening, eye width, or horizontal eye opening may correspond to a greater eye quality, which may correspond to a greater quality of the digital data signal. Further, in some instances, the eye quality may indicate an amount of crosstalk in which the greater the eye quality, the less crosstalk and vice versa.

In some embodiments, the EQM 106 may be communicatively coupled to the control system 108. The control system 108 may be configured to receive eye quality information regarding the eye quality measurements that may be generated by the EQM 106. For example, in some embodiments, the eye quality information may include one or more of the following: an overall eye opening, an eye margin, a percentage of eye opening, an internal eye height, an eye amplitude, an eye crossing, an eye quality factor, a vertical eye opening, an eye width, and a horizontal eye opening. Additionally or alternatively, the control system 108 may be configured to analyze the eye quality information to determine one or more of the following: an overall eye opening, an eye margin, a percentage of eye opening, an internal eye height, an eye amplitude, an eye crossing, an eye quality factor, a vertical eye opening, an eye width, and a horizontal eye opening. Further, in the present disclosure, reference to the term "eye quality measurement" may refer to eye quality information that may indicate an eye quality measurement.

In some embodiments, the control system 108 may be configured to adjust the decision threshold of the optical receiver 102 based on the eye quality that may be measured by the EQM 106 and the corresponding eye quality information that may be received by the control system 108. For example, in some embodiments, the control system 108 may be configured to analyze the measured eye quality and may make adjustments accordingly based on the analysis. The adjustment of the decision threshold of the optical receiver 102 may be done to at least partially compensate for crosstalk or other signal degradation. In some embodiments, the control system 108 may be configured to analyze and adjust the decision threshold according to one or more operations of method 200, 300, 400, or 500 described below.

In these or other embodiments, the system 100 may include one or more components configured to monitor for changes that may affect signal quality. For example, in some embodiments, the control system 108 may be configured to receive information related to one or more of the following: a temperature of the optical receiver, a received power of the optical signal, a bit rate of the digital data signal, and a channel frequency of the optical signal. Additionally or alternatively, the control system 108 may be configured to monitor for changes in one or more of the following: a temperature of the optical receiver, a received power of the optical signal, a bit rate of the digital data signal, and a channel frequency of the optical signal.

In some embodiments, in response to detecting a change and in response to an instruction received from the control system 108, the EQM 106 may be configured to measure the eye quality of the digital data signal. In these or other embodiments, the control system 108 may be configured to adjust the decision threshold based on an analysis of the eye quality that may be measured in response to detecting the change when the change negatively affects the eye quality.

In these or other embodiments, the EQM 106 may be configured to measure the eye quality of the digital data signal in a continuous or periodic manner and the control system 108 may be configured to analyze the measured eye quality in response to detecting the change. Additionally or alternatively, the control system 108 may be configured to adjust the decision threshold based on the eye quality that may be analyzed in response to detecting the change when the change negatively affects the eye quality. As such, in some embodiments, the system 100 may be configured to dynamically make adjustments to the decision threshold based on changing conditions.

Figure 1B:
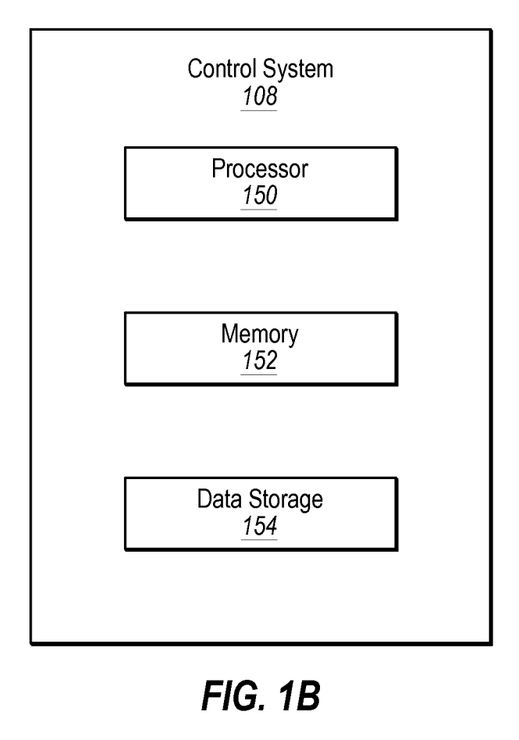
FIG. 1B illustrates an example embodiment of the control system of FIG. 1A.

FIG. 1B illustrates an example embodiment of the control system 108, according to one or more embodiments of the present disclosure. In some embodiments, the control system 108 may include one or more of the following: a processor 150, a memory 152, and a data storage 154. The processor 150, the memory 152, and the data storage 154 may be communicatively coupled.

In general, the processor 150 may include any suitable special-purpose or general-purpose computer, computing entity, or processing device including various computer hardware or software modules and may be configured to execute instructions stored on any applicable computer-readable storage media. For example, the processor 150 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, the processor 150 may include any number of processors configured to perform, individually or collectively, any number of operations described in the present disclosure.

In some embodiments, the processor 150 may be configured to interpret and/or execute program instructions and/or process data stored in the memory 152, the data storage 154, or the memory 152 and the data storage 154. In some embodiments, the processor 150 may fetch program instructions from the data storage 154 and load the program instructions in the memory 152. After the program instructions may be loaded into memory 152, the processor 150 may execute the program instructions.

The memory 152 and the data storage 154 may include computer-readable storage media for carrying or having computer-executable instructions or data structures stored thereon. Such computer-readable storage media may include any available media that may be accessed by a general-purpose or special-purpose computer, such as the processor 150. By way of example, and not limitation, such computer-readable storage media may include tangible or non-transitory computer-readable storage media including Random Access Memory (RAM), Read Only Memory (ROM), Electrically Erasable Programmable Read-Only Memory (EEPROM), CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 150 to perform a certain operation or group of operations.

Modifications, additions, or omissions may be made to FIGS. 1A and 1B without departing from the scope of the present disclosure. For example, the system 100 may include more or fewer elements than those illustrated and described in the present disclosure. Additionally, in some embodiments, the control system 108 may not include the memory 152 and/or the data storage 154. For example, when the processor 150 includes an FPGA or an ASIC, the control system 108 may not include the memory 152 or the data storage 154.

Figure 2:
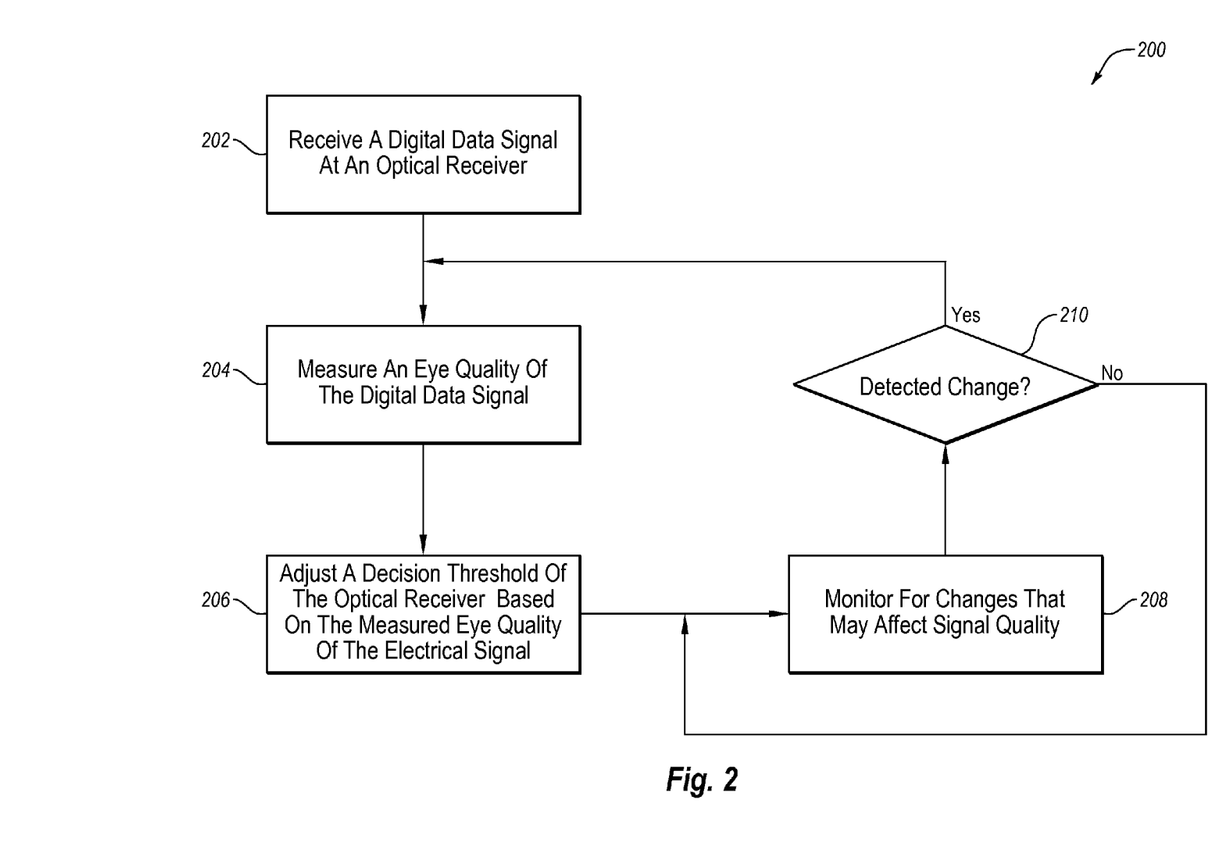
FIG. 2 is a flowchart of an example method of adjusting a decision threshold of an optical receiver.

FIG. 2 is a flowchart of an example method 200 of adjusting a decision threshold of an optical receiver, according to at least one embodiment described in the present disclosure. The method 200 may be performed by any suitable system, apparatus, or device. For example, one or more operations of the method 200 may be performed by one or more elements of the system 100 described above. Although illustrated with discrete blocks, the steps and operations associated with one or more of the blocks of the method 200 may be divided into additional blocks, combined into fewer blocks, or eliminated, depending on the particular implementation.

The method 200 may begin at block 202, where a digital data signal may be received. In some embodiments, the digital data signal may be included in an optical signal that may be received by an optical receiver. In some embodiments, the optical signal may be converted into an electrical signal that includes the digital data signal.

At block 204, an eye quality of the digital data signal may be measured. In some embodiments, the eye quality may be measured based on the digital data signal included in the electrical signal. Additionally or alternatively, the eye quality measurement may indicate eye quality information that may indicate one or more of the following: an overall eye opening, an eye margin, a percentage of eye opening, an internal eye height, an eye amplitude, an eye crossing, an eye quality factor, a vertical eye opening, an eye width, and a horizontal eye opening.

At block 206, a decision threshold of the optical receiver may be adjusted based on the measured eye quality of the electrical signal.

In some embodiments, the method 200 may include blocks 208 and 210. At block 208, changes that may affect signal quality may be monitored. For example, a temperature of the optical receiver, a received power of the optical signal, a bit rate of the digital data signal, or a channel frequency of the optical signal may be monitored.

At block 210 it may be determined whether or not a change in one or more of the monitored factors has occurred. In some embodiments, the method 200 may return to block 208 from block 210 in response to a change not being detected at block 210. Additionally or alternatively, the method 200 may return to block 204 from block 210 in response to a change being detected at block 210. As such, blocks 208 and 210 may allow for dynamic changes to the decision threshold based on changes in one or more factors that may affect signal quality.

Accordingly, the method 200 may be used to adjust a decision threshold of an optical receiver. Modifications, additions, or omissions may be made to the method 200 without departing from the scope of the present disclosure. For example, the operations of method 200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the operations associated with blocks 208 or 210 may be omitted. Further, as indicated below with respect to methods 300, 400, and 500, the operations associated with blocks 204 and 206 may include any number of variations.

Figure 3:
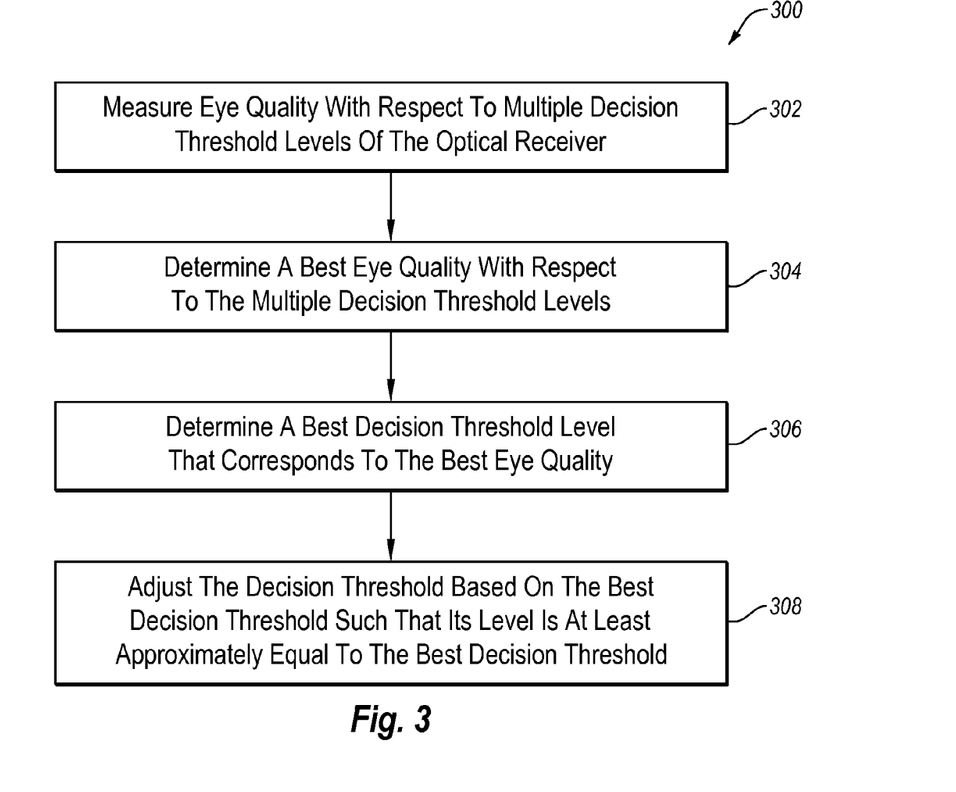
FIG. 3 is a flowchart of another example method of adjusting a decision threshold of an optical receiver.

FIG. 3 is a flowchart of another example method 300 of adjusting a decision threshold of an optical receiver, according to at least one embodiment described in the present disclosure. The method 300 may be performed by any suitable system, apparatus, or device. For example, one or more operations of the method 300 may be performed by one or more elements of the system 100 described above. Although illustrated with discrete blocks, the steps and operations associated with one or more of the blocks of the method 300 may be divided into additional blocks, combined into fewer blocks, or eliminated, depending on the particular implementation. In addition, in some embodiments, one or more of the operations of the method 300 may be included in one or more of the blocks 204 and 206 of FIG. 2.

The method 300 may begin at block 302, where eye quality of the digital data signal may be measured with respect to multiple decision threshold levels of the optical receiver. At block 304, a best eye quality with respect to the different multiple decision threshold levels may be determined. For example, a largest overall eye opening, a largest eye margin, a largest percentage of eye opening, a largest internal eye height, a largest eye amplitude, a largest eye crossing, a largest eye quality factor, a largest vertical eye opening, a largest eye width, or a largest horizontal eye opening may be determined from eye quality information that corresponds to the different eye quality measurements that may be made with respect to the multiple decision threshold levels. At block 306, a decision threshold level (e.g., of the multiple decision threshold levels) that corresponds to the best eye quality may be determined as a best decision threshold level.

At block 308, the decision threshold may be adjusted based on the best decision threshold level. In some embodiments, the decision threshold may be adjusted such that its level is approximately equal to or equal to the best decision threshold level.

Accordingly, the method 300 may be used to adjust a decision threshold of an optical receiver. Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4:
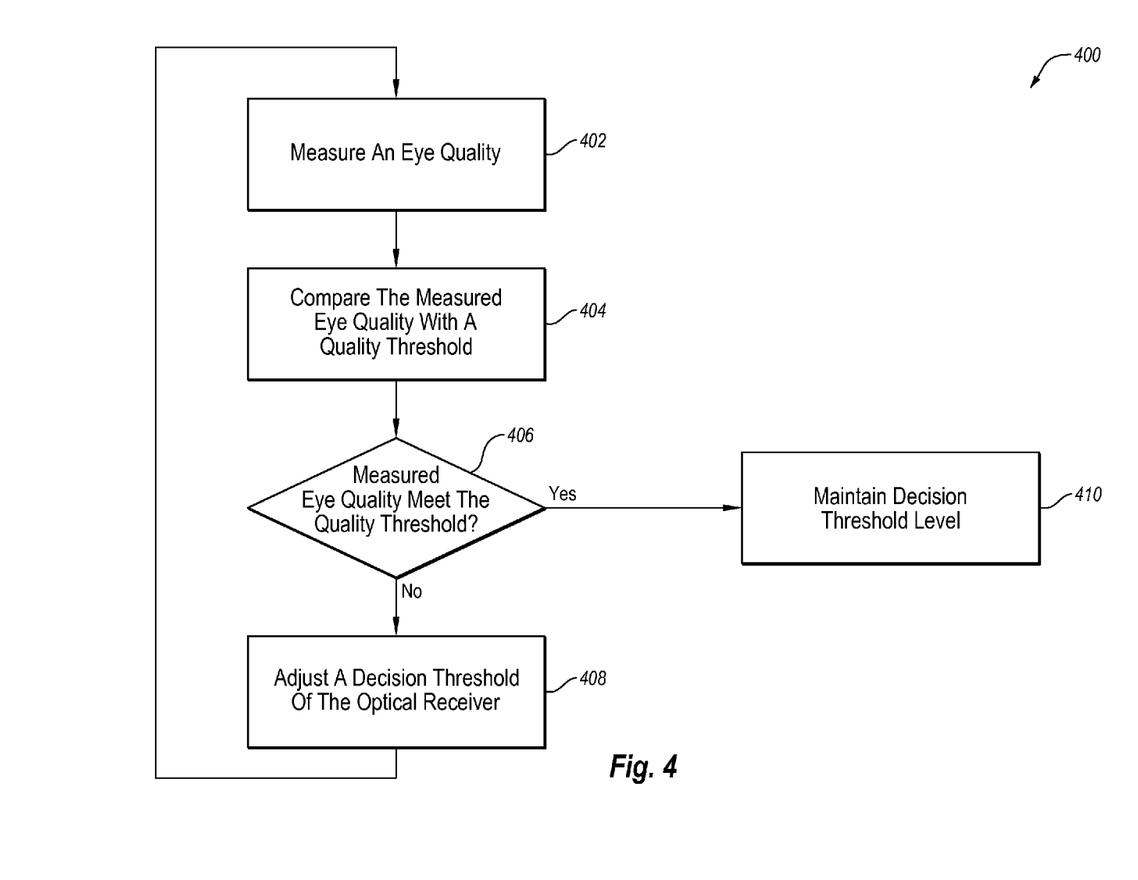
FIG. 4 is a flowchart of another example method of adjusting a decision threshold of an optical receiver.

FIG. 4 is a flowchart of another example method 400 of adjusting a decision threshold of an optical receiver, according to at least one embodiment described in the present disclosure. The method 400 may be performed by any suitable system, apparatus, or device. For example, one or more operations of the method 400 may be performed by one or more elements of the system 100 described above. Although illustrated with discrete blocks, the steps and operations associated with one or more of the blocks of the method 400 may be divided into additional blocks, combined into fewer blocks, or eliminated, depending on the particular implementation. In addition, in some embodiments, one or more of the operations of the method 400 may be included in one or more of the blocks 204 and 206 of FIG. 2.

The method 400 may begin at block 402, where an eye quality of the digital data signal may be measured. At block 404, the measured eye quality may be compared with a quality threshold. In some embodiments, comparing the measured eye quality with the quality threshold may be performed by a control system (e.g., the control system 108 of FIGS. 1A and 1B) based on eye quality information that corresponds to the measured eye quality. In some embodiments, the quality threshold may include an overall eye opening threshold, an eye margin threshold, a percentage of eye opening threshold, an internal eye height threshold, an eye amplitude threshold, an eye crossing threshold, an eye quality factor threshold, a vertical eye opening threshold, an eye width threshold, and a horizontal eye opening threshold.

At block 406, it may be determined whether the measured eye quality meets the quality threshold. In some embodiments, the determination may be made based on the comparison that may be made at block 404. In some embodiments, in response to the measured eye quality not meeting the quality threshold, the method 400 may proceed from block 406 to block 408. Additionally or alternatively, in response to the measured eye quality meeting the quality threshold, the method 400 may proceed from block 406 to block 410.

At block 408, the decision threshold of the optical receiver may be adjusted. Following block 408, the method 400 may return to block 402. At block 410, the decision threshold level may be maintained in response to the quality threshold being satisfied. As such, the method 400 may be performed until the eye quality satisfies the quality threshold.

Accordingly, the method 400 may be used to adjust a decision threshold of an optical receiver. Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 5:
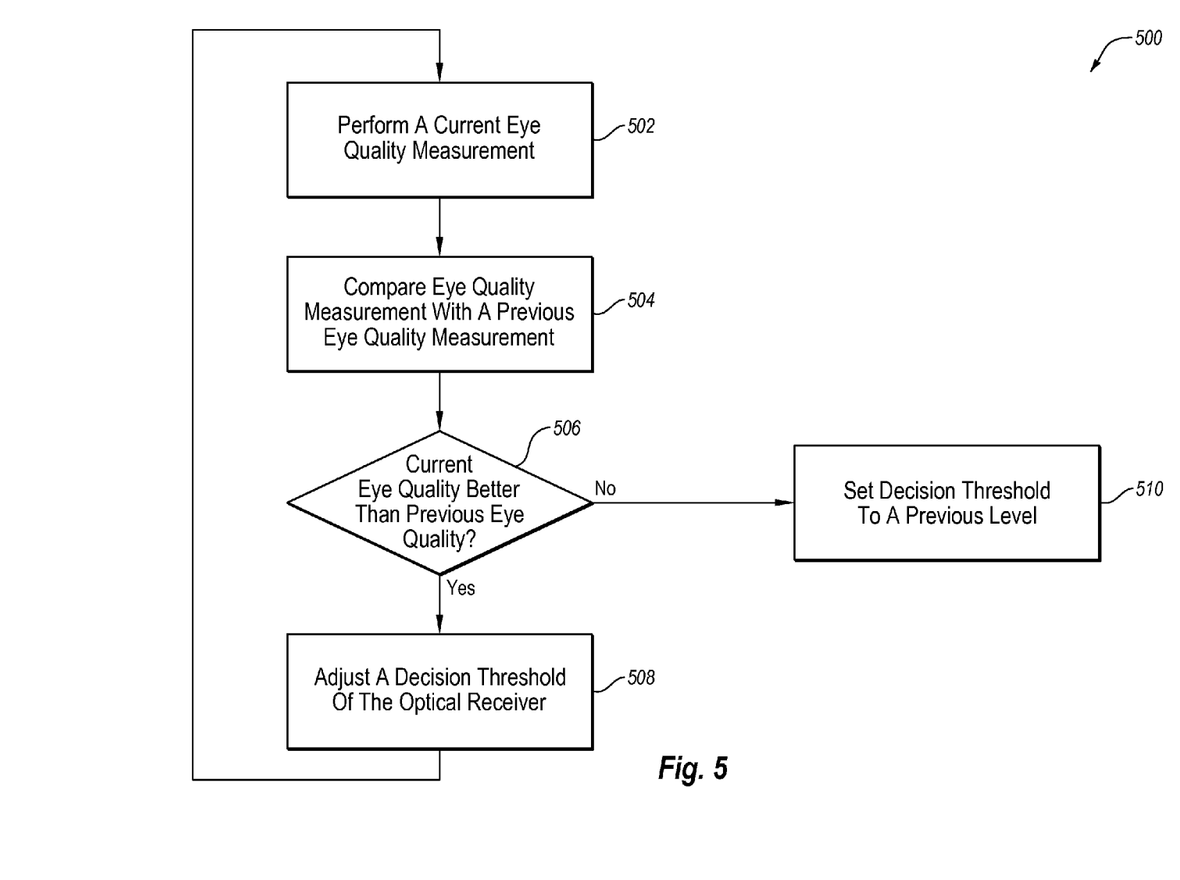
FIG. 5 is a flowchart of another example method of adjusting a decision threshold of an optical receiver.

FIG. 5 is a flowchart of another example method 500 of adjusting a decision threshold of an optical receiver, according to at least one embodiment described in the present disclosure. The method 500 may be performed by any suitable system, apparatus, or device. For example, one or more operations of the method 500 may be performed by one or more elements of the system 100 described above. Although illustrated with discrete blocks, the steps and operations associated with one or more of the blocks of the method 500 may be divided into additional blocks, combined into fewer blocks, or eliminated, depending on the particular implementation. In addition, in some embodiments, one or more of the operations of the method 500 may be included in one or more of the blocks 204 and 206 of FIG. 2.

The method 500 may begin at block 502, where a current eye quality of the digital data signal may be measured. At block 504, the measured current eye quality may be compared with a previous eye quality measurement. In some embodiments, the previous eye quality measurement may include the immediately preceding eye quality measurement. Additionally or alternatively, the comparison may compare one or more of the following: the current overall eye opening with the previous overall eye opening, the current eye margin with the previous eye margin, the current percentage of eye opening with the previous percentage of eye opening, or the current internal eye height with the previous internal eye height. In some embodiments, comparing the previously measured eye quality with the currently measured eye quality may be performed by a control system (e.g., the control system 108 of FIGS. 1A and 1B) based on eye quality information that corresponds to the previously measured eye quality and the currently measured eye quality.

At block 506, it may be determined whether the current eye quality is better than the previous eye quality. In some embodiments, the determination may be made based on the comparison that may be made at block 504. In some embodiments, in response to the current eye quality being better than the previous eye quality, the method 500 may proceed from block 506 to block 508. Additionally or alternatively, in response to the current eye quality not being better than the previous eye quality, the method 500 may proceed from block 506 to block 510.

At block 508, the decision threshold of the optical receiver may be adjusted. Following block 508, the method 500 may return to block 502. At block 510, the decision threshold level may be set to a previous level that corresponds to the previous eye quality in response to the current eye quality not being better than the previous eye quality.

Accordingly, the method 500 may be used to adjust a decision threshold of an optical receiver. Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the control system. In some embodiments, the different components, modules, engines, and services described in the present disclosure may be implemented as objects or processes that execute on the control system (e.g., as separate threads).

While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any control system as previously defined in the present disclosure, or any module or combination of modulates running on a control system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
receiving a digital data signal at an optical receiver;
recovering a clock signal from the digital data signal;
measuring an eye quality of the received digital data signal by an eye quality monitor that is driven based on the recovered clock signal;
adjusting a decision threshold value of a decision threshold controller of the optical receiver based on the measured eye quality;
comparing the adjusted decision threshold value against the digital data signal to determine whether to output a digital "HIGH" value for the digital data signal or to output a digital "LOW" value for the digital data signal;
obtaining a plurality of signal quality factors that include: a temperature of the optical receiver, a power of an optical signal received at the optical receiver and that includes the digital data signal, a bit rate of the digital data signal, and a channel frequency of the optical signal, wherein the obtaining of each of the signal quality factors is based on the eye quality being affected by the signal quality factors;
detecting a change in the plurality of signal quality factors based on the obtained signal quality factors;
generating an eye quality measurement control signal in response to detecting the change;
activating the eye quality monitor based on the eye quality measurement control signal such that the eye quality monitor takes a subsequent measurement of the eye quality of the digital data signal in response to the change being detected;
analyzing the subsequent measurement of the eye quality in response to detecting the change; and
readjusting the decision threshold value based on the analyzing of the subsequent measurement of the eye quality that was made in response to the eye quality measurement control signal that was generated in response to detecting the change.

2. The method of claim 1, further comprising:
measuring the eye quality of the digital data signal with respect to a plurality of decision threshold value levels;
determining a best eye quality with respect to the plurality of decision threshold value levels;
determining a best decision threshold value level of the plurality of decision threshold value levels that corresponds to the determined best eye quality; and
adjusting, based on the determined best decision threshold value, the decision threshold value such that its level is at least approximately equal to the determined best decision threshold value.

3. The method of claim 2, wherein determining the best eye quality includes determining one or more of the following: a largest overall eye opening, a largest eye margin, a largest percentage of eye opening, a largest internal eye height, a largest eye amplitude, a largest eye crossing, a largest eye quality factor, a largest vertical eye opening, a largest eye width, and a largest horizontal eye opening.

4. The method of claim 1, further comprising:
comparing the measured eye quality with a quality threshold; and
adjusting the decision threshold in response to the comparing indicating that the measured eye quality does not satisfy the quality threshold.

5. The method of claim 4, further comprising repeating measuring the eye quality and adjusting the decision threshold until the eye quality satisfies the quality threshold.

6. The method of claim 4, wherein the quality threshold includes one or more of the following: an overall eye opening threshold, an eye margin threshold, a percentage of eye opening threshold, an internal eye height threshold, an eye amplitude threshold, an eye crossing threshold, an eye quality factor threshold, a vertical eye opening threshold, an eye width threshold, and a horizontal eye opening threshold.

7. The method of claim 1, further comprising:
performing a first eye quality measurement with respect to the decision threshold being at a first level;
adjusting the decision threshold to a second level;
performing a second eye quality measurement with respect to the decision threshold being at the second level;
determining that the digital data signal has a better quality with the decision threshold at the first level as opposed to the second level based on the first eye quality measurement and the second eye quality measurement; and
adjusting the decision threshold back to the first level in response to determining that the digital data signal has a better quality with the decision threshold at the first level as opposed to the second level.

8. A system comprising:
an optical receiver configured to:
receive an optical signal that includes a digital data signal; and
convert the optical signal into an electrical signal that includes the digital data signal;
an eye quality monitor communicatively coupled to the optical receiver and configured to:
receive the electrical signal; and
measure an eye quality of the digital data signal included in the electrical signal; and
a control system communicatively coupled to the optical receiver and the eye quality monitor and configured to:
adjust a decision threshold value of a decision threshold controller of the optical receiver based on the eye quality measured by the eye quality monitor, the decision threshold value being compared against the electrical signal to determine whether to output a digital "HIGH" value for the digital data signal or to output a digital "LOW" value for the digital data signal;
detect a change in two or more of the following: a temperature of the optical receiver, a power of an optical signal that includes the digital data signal, a bit rate of the digital data signal, and a channel frequency of the optical signal;
generate an eye quality measurement control signal in response to detecting the change;
communicate the eye quality measurement control signal to the eye quality monitor such that the eye quality monitor is activated to take a subsequent measurement of the eye quality of the digital data signal in response to the change being detected;
obtain, from the eye quality monitor, the subsequent measurement of the eye quality;
analyze the subsequent measurement of the eye quality in response to detecting the change; and
readjust the decision threshold value based on the analyzing of the subsequent measurement of the eye quality that was measured in response to the eye quality measurement control signal that was generated in response to detecting the change.

9. The system of claim 8, wherein:
the eye quality monitor is further configured to measure the eye quality of the digital data signal with respect to a plurality of decision threshold value levels; and
the control system is further configured to:
determine a best eye quality with respect to the plurality of decision threshold value levels;
determine a best decision threshold value level of the plurality of decision threshold value levels that corresponds to the determined best eye quality; and
adjust, based on the determined best decision threshold value, the decision threshold value such that its level is at least approximately equal to the determined best decision threshold value.

10. The system of claim 9, wherein determining the best eye quality includes determining one or more of the following: a largest overall eye opening, a largest eye margin, a largest percentage of eye opening, a largest internal eye height, a largest eye amplitude, a largest eye crossing, a largest eye quality factor, a largest vertical eye opening, a largest eye width, and a largest horizontal eye opening.

11. The system of claim 8, wherein the control system is further configured to:
compare the measured eye quality with a quality threshold; and
adjust the decision threshold in response to the comparing indicating that the measured eye quality does not satisfy the quality threshold.

12. The system of claim 11, wherein:
the eye quality monitor is further configured to repeat measuring the eye quality; and
the control system is further configured to adjust the decision threshold until the eye quality satisfies the quality threshold.

13. The system of claim 11, wherein the quality threshold includes one or more of the following: an overall eye opening threshold, an eye margin threshold, a percentage of eye opening threshold, an internal eye height threshold, an eye amplitude threshold, an eye crossing threshold, an eye quality factor threshold, a vertical eye opening threshold, an eye width threshold, and a horizontal eye opening threshold.

14. The system of claim 8, wherein:
the eye quality monitor is further configured to perform a first eye quality measurement with respect to the decision threshold being at a first level;
the control system is further configured to adjust the decision threshold to a second level;
the eye quality monitor is further configured to perform a second eye quality measurement with respect to the decision threshold being at the second level; and
the control system is further configured to:
determine that the digital data signal has a better quality with the decision threshold at the first level as opposed to the second level based on the first eye quality measurement and the second eye quality measurement; and
adjust the decision threshold back to the first level in response to determining that the digital data signal has a better quality with the decision threshold at the first level as opposed to the second level.

15. One or more processors configured to cause a system to perform operations, the operations comprising:
detecting a change in three or more of the following: a temperature of an optical receiver, a power of an optical signal received at the optical receiver and that includes a digital data signal, a bit rate of the digital data signal, and a channel frequency of the optical signal;
generating an eye quality measurement control signal in response to detecting the change;
communicating the eye quality measurement control signal to an eye quality monitor such that the eye quality monitor is activated to take a measurement of an eye quality of the digital data signal in response to the change being detected;
obtaining, from the eye quality monitor, the measurement of the eye quality;
analyzing the measurement of the eye quality of the digital data signal in response to detecting the change; and
adjusting a decision threshold value, which is compared against the digital data signal, of the optical receiver based on the analyzing of the measurement of the eye quality that was made in response to the eye quality measurement control signal that was generated in response to detecting the change.

16. The one or more processors of claim 15, wherein the operations further comprise:
analyzing the eye quality of the digital data signal with respect to a plurality of decision threshold value levels;
determining a best eye quality with respect to the plurality of decision threshold value levels;
determining a best decision threshold value level of the plurality of decision threshold value levels that corresponds to the determined best eye quality; and
adjusting, based on the determined best decision threshold value, the decision threshold value such that its level is at least approximately equal to the determined best decision threshold value.

17. The one or more processors of claim 15, wherein the operations further comprise:
comparing the measured eye quality with a quality threshold; and
adjusting the decision threshold in response to the comparing indicating that the measured eye quality does not satisfy the quality threshold.

18. The one or more processors of claim 15, wherein the operations further comprise:
analyzing a first eye quality measurement with respect to the decision threshold being at a first level;
adjusting the decision threshold to a second level;
analyzing a second eye quality measurement with respect to the decision threshold being at the second level;
determining that the digital data signal has a better quality with the decision threshold at the first level as opposed to the second level based on the first eye quality measurement and the second eye quality measurement; and
adjusting the decision threshold back to the first level in response to determining that the digital data signal has a better quality with the decision threshold at the first level as opposed to the second level.

* * * * *